United States Patent [19]

Kennealy

[11] Patent Number: 5,764,792

[45] Date of Patent: Jun. 9, 1998

[54] METHOD AND APPARATUS FOR PROCESSING IMAGES

[75] Inventor: John P. Kennealy, Gaithersburg, Md.

[73] Assignee: Oncor, Inc., Gaithersburg, Md.

[21] Appl. No.: 588,915

[22] Filed: Jan. 19, 1996

[51] Int. Cl.$^6$ .................................................. G06K 9/00

[52] U.S. Cl. ...................... 382/133; 382/134; 382/165; 382/129; 128/653.1; 250/462.1; 356/39; 422/73; 436/519; 436/520

[58] Field of Search ................................. 382/128, 134, 382/164, 165, 133; 364/413.13, 413.08, 414.07; 128/653.1; 250/462.1; 356/39; 422/73; 436/519, 520

[56] References Cited

U.S. PATENT DOCUMENTS

| | | | |
|---|---|---|---|
| 3,827,804 | 8/1974 | Miller | 356/39 |
| 4,000,417 | 12/1976 | Adkisson et al. | 250/201 |
| 4,048,616 | 9/1977 | Hart et al. | 340/146.3 |
| 4,097,845 | 6/1978 | Bacus | 340/146.3 |
| 5,264,369 | 11/1993 | Sakata et al. | 436/63 |
| 5,598,842 | 2/1997 | Ishihara | 128/637 |

*Primary Examiner*—Jose L. Couso
*Assistant Examiner*—Anh Hong Do
*Attorney, Agent, or Firm*—Burns, Doane, Swecker & Mathis, L.L.P.

[57] ABSTRACT

A method and apparatus for detecting rare cells in a biological sample is disclosed. A color image of the sample is generated and the color image is decomposed into its color components. A first mask is then generated based upon a first color characteristic of the rare cells. At least one color component of the color image is filtered using the mask to produce at least a first composite image which contains features having the first color characteristic. At least a second mask is then generated based upon other color characteristics of the rare cells and at least the first composite image is filtered using at least the second mask to create at least a second composite image. The color and/or shape of features in the at least second composite image are analyzed and a list of locations of probable rare cells is generated from the color and/or shape analysis.

18 Claims, 4 Drawing Sheets

METHOD AND APPARATUS FOR PROCESSING IMAGES

FIELD OF THE INVENTION

The present invention relates to image processing, and more particularly to a method and apparatus for detecting infectious diseases, or rare or abnormal cells in a biological sample.

BACKGROUND OF THE INVENTION

Many current DNA diagnostic technologies under development involve DNA amplification and/or DNA "chip" technology. These techniques are highly sensitive and will have many useful applications. However, all these solution-based assays destroy cellular morphology and the results represent an average result for the entire population of cells tested. This can result in a lose of sensitivity when looking for a weak signal in a high background of normal DNA. In addition, a pathologist often relies on cellular morphology when making a diagnosis.

One important area of genetic analysis are tests designed to analyze the DNA structure of fetuses. In these tests, fetal cells are analyzed to detect if there are any chromosomal abnormalities. Fetal cells are obtained by either amniocentesis or chorionic villus sampling. The fetal cells are then analyzed by standard cytogenetics. This invasive procedure poses a health risk to both the mother and fetus and is expensive. Consequently, this procedure is performed only on pregnancies considered to be at high risk of carrying a fetus with chromosomal abnormalities, with advance maternal age being the most common risk factor. Under these restrictions, current prenatal diagnosis fail to detect approximately seventy-five percent of all fetuses with chromosomal aneuploidies since they occur in women under the age of thirty-five who are not routinely tested.

A major obstacle in non-invasive prenatal diagnosis is the ability to isolate and analyze a rare or abnormal cell population or infected cells or viruses within the sample. For example, there may typically be between one hundred and one thousand fetal nucleated red blood cells (nRBC) in a ten milliliter sample of maternal blood which contains approximately $10^{10}$ cells. There are currently a number of approaches to isolate fetal cells from maternal blood. These approaches use antibodies in conjunction with either a flow cytometer or magnetic beads to produce a population of cells highly enriched for nucleated fetal erythrocytes. However, there are several drawbacks to these approaches. The yield of fetal cells after multiple enrichment steps is still low. Since the starting sample contains typically no more than the thousand cells, it is imperative to have high yields. Secondly, even a highly enriched population of fetal cells will contain many contaminated maternal cells making it necessary to scan a large number of cells. This increases the time and expense associated with performing these tests.

Thus, there is a need for a method and apparatus for providing a rapid non-invasive and inexpensive technique for detecting rare cells in a biological sample.

SUMMARY OF THE INVENTION

As an object of the present invention provide a method and apparatus for a rapid non-invasive and inexpensive technique for detecting infectious diseases, and abnormal or rare cells by comparing phenotypic characteristics of cells within a biological sample. The rare cell imaging system enables the development of novel DNA diagnostic tests a number of different areas including identifying fetal cells and maternal circulation, identifying micrometastasis in cancer patients, and the direct identification of an infectious disease causing agents such as viruses and fungi which are difficult or impossible to culture and pose a severe diagnostic dilemma.

According to one embodiment of the present invention, a method and apparatus for detecting rare cells in a biological sample. A color image of the sample is generated and the color image is decomposed into its color components. A first mask is then generated based upon a first color characteristic of the rare cells. At least one color component of the color image is filtered using the mask to produce at least a first composite image which contains features having the first color characteristic. At least a second mask is then generated based upon other color characteristics of the rare cells and at least the first composite image is filtered using at least the second mask to create at least a second composite image. The color and/or shape of features in the at least second composite image are analyzed and a list of locations of probable rare cells is generated from the color and/or shape analysis.

According to one embodiment of the present invention, a method and apparatus for detecting nucleated red blood cells in a sample of maternal blood is disclosed. First, an image of the biological sample is formed by a camera and is stored in memory. A first mask is then generated according to color characteristics of nucleated red blood cells which effectively filters out all of the white blood cells in the sample. The red and blue color components of said color image are filtered using the mask to produce first and second composite images which contain features having the first color characteristic. The intensity of the first composite image is then inverted and combined with the second composite image to form a third composite image. A second mask based upon other characteristics of the nucleated red blood cells is then generated. The color image is filtered using the second mask to create a fourth composite image. The second mask is then revised wherein features in the fourth composite image which are less than a predetermined size are blocked out. The color image is then filtered using the revised second mask to produce a fifth composite image. The color and/or shape of features in said fifth composite image are then analyzed and a list of locations of probable nucleated red blood cells is generated from the color and/or shape analysis.

BRIEF DESCRIPTION OF THE DRAWINGS

These and other features and advantages of the present invention will be readily apparent to one of ordinary skill in the art from the following written description, used in conjunction with the drawings, in which.

DETAILED DESCRIPTION

Figure 1:
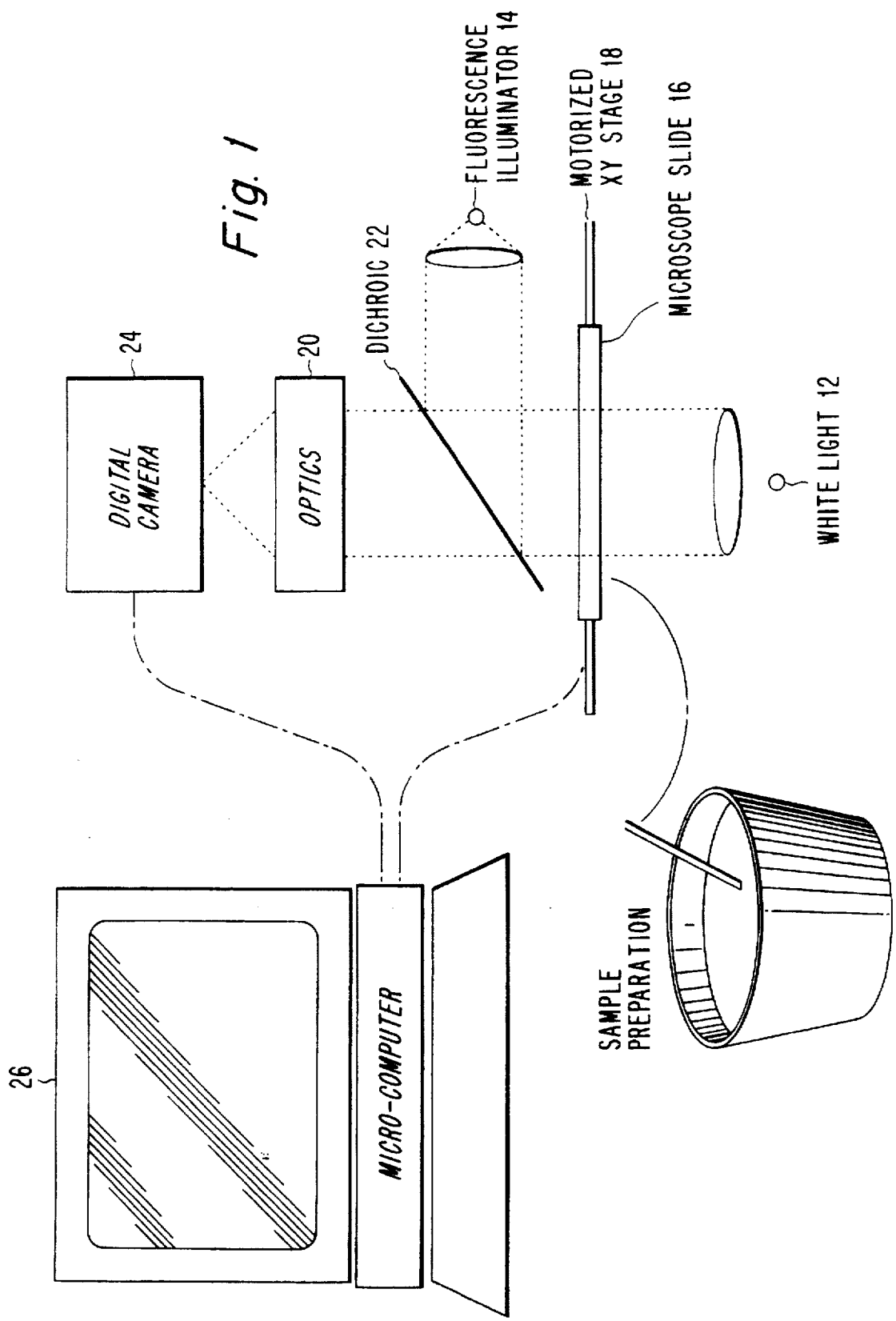
FIG. 1 illustrates an imaging system according to one embodiment of the present invention.
Figure 2:
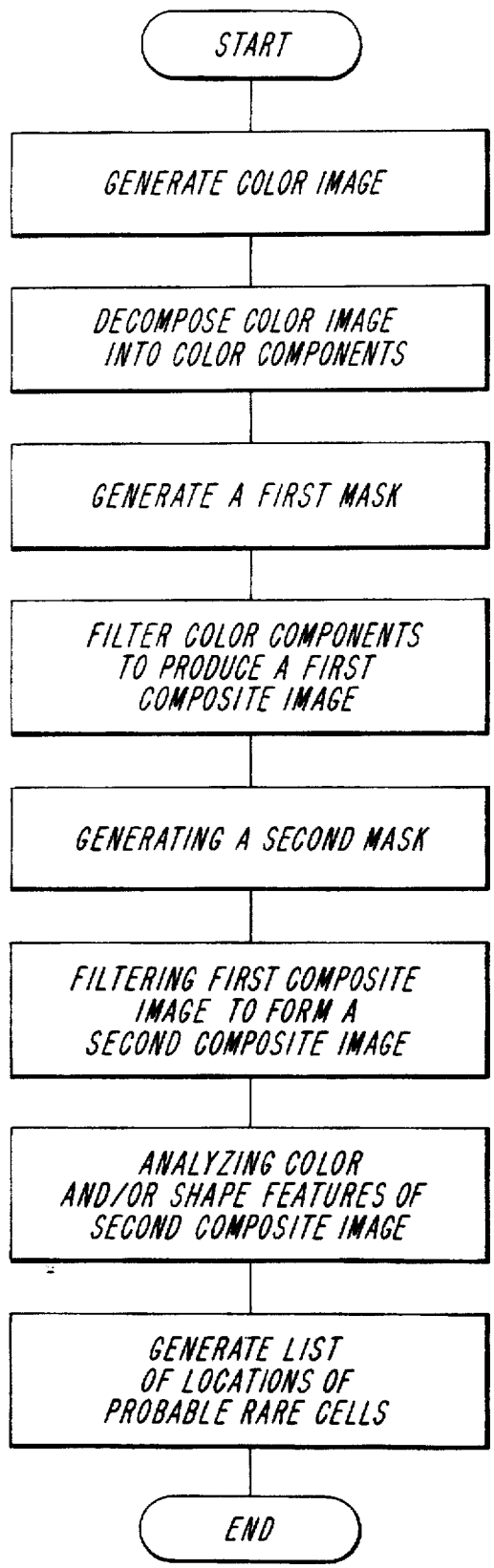
FIG. 2 illustrates a flowchart for detecting rare cells.

FIG. 1 illustrates an imaging system 10 according to one embodiment of the present invention. The imaging system contains a white light source 12 and a florescence illuminator 14 which direct light onto a microscope slide 16 which contains a biological sample, wherein the slide 16 is positioned on a motorized XY stage 18. The imaging system employs two distinctly different types of electronic imaging: low magnification, bright field imaging for rare cells detection; and higher magnification, fluorescence imaging for FISH genetic analysis. As a result, the imaging system contains an optical magnification system 20 which has a plurality of magnification settings. The imaging system 10 also has a dichroic mirror positioned between the optical magnification system for reflecting certain colors of light while allowing other colors to pass through. The motorized XY stage has two primary functions. First, the constant velocity transports a microscope slide above a high intensity slit illuminator which supports bright field imaging. In addition, the stage can also reposition the microscope slide to the locations of targeted rare cells which are then to be FISH analyzed. An image acquisition unit such as a camera 24 is used to record the images from the biological sample on the microscope slide. The images are then stored in a memory in a microprocessing apparatus 26. The microprocessor 26 processes control and automated data analysis for both rare cell find and FISH analysis.

According to one embodiment of the present invention, a color based rare cell detecting analysis by comparing phenotypic characteristics of cells within a biological sample is disclosed which leads to fast processing of color image data. The two primary steps of this method are bulk filtering and detailed colorimetric cell analysis. Bulk filtering is a term commonly used to describe an initial phase of automated analysis in image processing. The purpose of bulk filtering is to economically find and cull from the data stream those regions of data most likely to contain the interesting segments of data. The reason for bulk filtering is to minimize the amount of data which must be subjected to intensive analysis, thereby also minimizing the total computing time associated with the overall automated analysis task. The present bulk filtering system employs data adaptive, image global color characteristics for initial segmentation called color morphological processing. If useful segmentation can be achieved based on global color characteristics, then the amount of data which must be subjected to detailed local analysis is greatly reduced. Local analysis consists primarily of detailed color classification of candidate cells, although some spatial, i.e., shape, analysis can also assist in the discrimination of image artifacts from rare cells.

Color morphological processing has a number of attractions one of which is the simplicity of the processing and the attendant computational economy. Some of the other characteristics which make it attractive for the present invention are magnification independence, geometry independence, shape independence, data adaptive, and size scalable. In the present invention, a color image of a biological sample is obtained in a camera and stored in a memory. The image is then decomposed into different image components such as red, green and blue image components. It will be understood by one skilled in the art that the present invention also applies to other image components and is not limited to red, green, and blue image components. Each component is adaptably processed based upon a histogram of its gray scale intensities. Computationally, a histogram is a fast process. Depending on the modality of a particular histogram, global segmentation of each component can be carried out via thresholding based upon histogram statistics. The modality may dictate that the image be segmented into two, three or even more segments. Segmented in this manner, each continuous intensity image component is reduced to two binary masks. Here a mask is simply an image-like array of numbers, where the values of the numbers making up the mask are either zero or one. The eventual utility of this type of mask is as follows. When applied with one or more of the original image components, the mask selects or filters out a specific type of information content from the image.

The mask generation process is also known as histogram based adaptive segmentation. This type of segmentation is image global, and it operates based upon the global statistics of the image. It is adaptive to the characteristics of the data and its success is not highly dependent on the contrast range within any color component of the data. Even for data whose histogram indicates no high order modality, the data can be adaptively segmented, between the limits of histogram minimum and maximum thresholds, into either equal size populations or equal intensity-interval populations.

The histogram based adaptive segmentation is only the first step in this color morphological processing approach. After segmentation of one or more of the RGB components, the full range of image arithmetic operation can be applied to the color based segmented images as will be described below. These are also simple computational operations. Whichever image arithmetic operations are chosen, they are executed globally. Extraction of local features occurs naturally, as a consequence of a well chosen operation mix. For example, the color characteristics associated with a particular type of rare cell usually influence the image representation of that cell in one or more components of the RGB image. A composite image, generated, for example, from the addition or multiplication of appropriate component segments, will often enhance the visibility of the sought after rare cell feature.

A composite image generated by the combination of masking enhancement operations outlined above, will normally contain a superset of rare cell features. In other words, the rare cells will typically exist as outliers of the cell population extracted by the masking and enhancement operations. Thus, the final aspect of bulk filtering is a global statistical analysis of the composite image to further down select the outliers. A final mask is then made from the contrast enhanced composite image, retaining only the statistical deviations from the cell population contained in the composite image. Colorimetric analysis of the bulk filtered imagery can further improve the reliability of rare cell detection. Even the small population of image pixels remaining from bulk filtering can be subdivided based on pixel color imagery. In conjunction with shape analysis, pixel color imagery provides highly specific discrimination of rare cells from artifacts. Geometric size-shape analysis can also provide useful clues about whether a feature is a cell or an artifact. Combined color geometry analysis is the final artifact filtering process which outputs a list of the possible rare cells.

Figure 3:
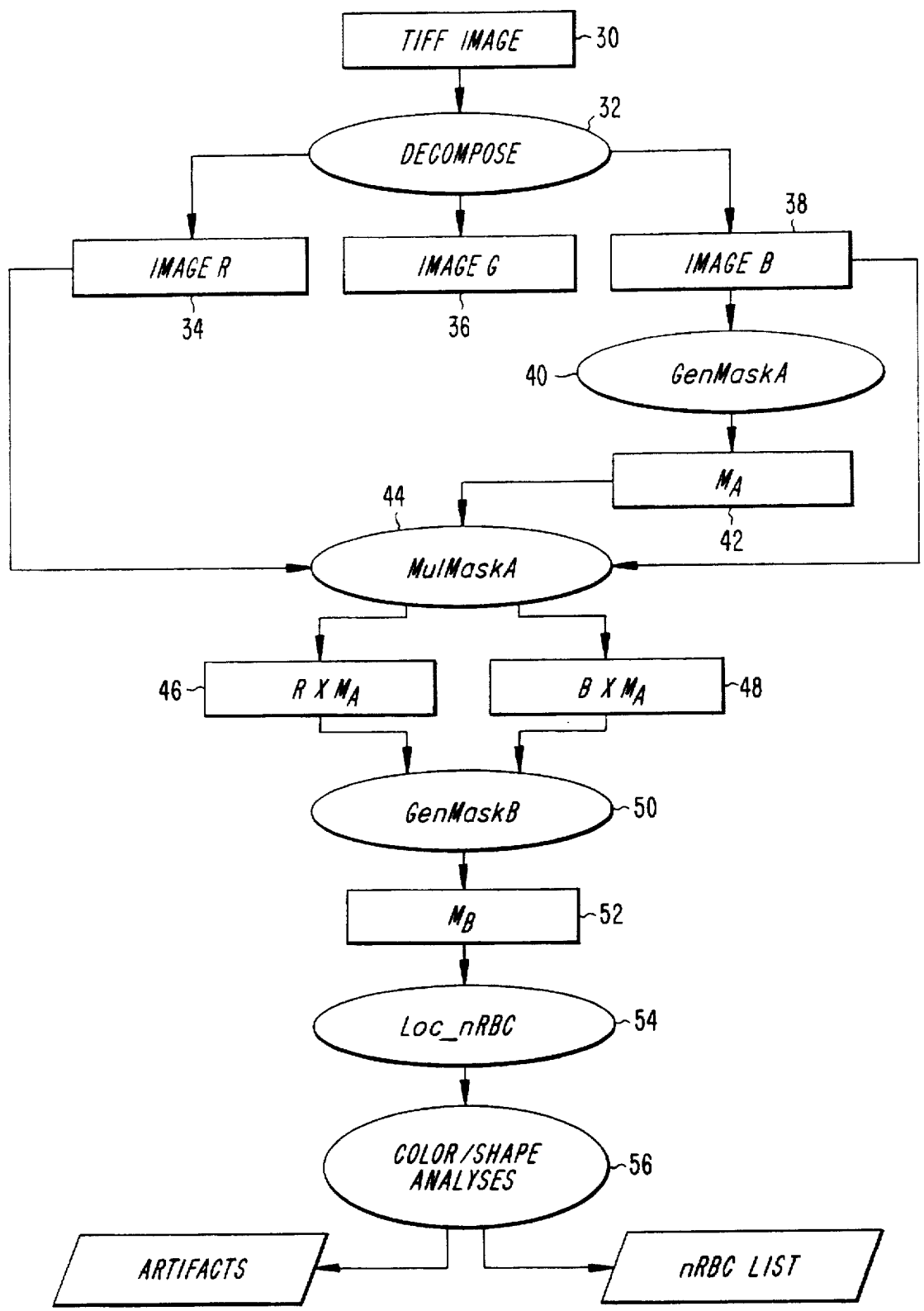
FIG. 3 illustrates a flowchart for detecting nucleated red blood cells according to one embodiment of the present invention.

According to one specific embodiment of the present invention, the imaging system can be used to detect fetal nucleated red blood cells in a stained maternal blood sample as will be described with reference to FIG. 3. A color image 30 of the stained blood sample is obtained using the imaging apparatus illustrated in FIG. 1. The color image is then decomposed into three discrete color components RGB (red, green, blue) 34, 36, and 38. Under bright field illumination, the stained blood samples yield images in which the components take on specific color characteristics. For example, enucleated erythrocytes are red, lymphocytes are blue and nucleated red blood cells appear as red annular regions around blue centers. The relative size of the red cell nuclei varies greatly, so the nucleus size cannot be used as a discriminate feature in finding the nucleated red blood cells. Thus, color characteristics can be used as a discriminate feature.

Figure 4:
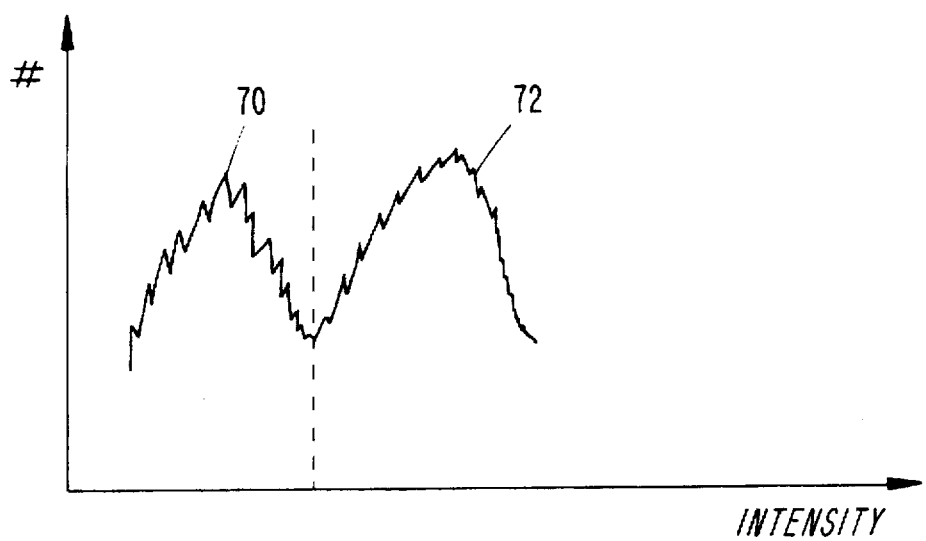
FIG. 4 illustrates a histogram for generating mask A according to one embodiment of the present invention.

In the first step of bulk filtering, the red cells in the image are separated from the white cells. It has been observed that in blue light, red cells are considerably darker than all other features in the image. Thus, this color feature can be used to separate the red and white cells by using an intensity histogram of the blue image. As is illustrated in FIG. 4, the histogram of the blue image is highly bimodal. Since the red cells are darker in blue light, the red cells have less intensity and are represented by the node 70 while the white cells, which have a greater intensity, are represented by the node 72. So by using this information, the red cells can be separated from the white cells by defining a threshold value T which corresponds to the minimum between the two nodes. A thresholding of the blue image, based upon this morphology, leads to a generation of a segmentation mask, mask A illustrated in FIG. 3. As explained earlier, a mask is an image-like array of numbers, where the values of the numbers making up the mask are either zero or one. Thus, pixels with intensities on one side of the threshold value T are assigned one value and pixels with intensities on the other side of the threshold value are assigned the other value. In this example, the pixels representing the red cells are assigned 1's while the pixels representing the white cells and any other features which have an intensity greater than the threshold value T are assigned 0'S. Therefore when the mask is applied to the red and blue components of the image, a second image 46 and a third image 48 are produced which only shows the features defined by the pixels which were assigned 1's in the mask.

The next step in the bulk filtering process is to distinguish nucleated red blood cells from other red blood cells. In both red and blue light, the nucleated red blood cells are distinctive. In red light, the central region of a nucleated red blood cell is consistently darker than normal red blood cells, because of the mixture therebetween blue and red. In blue light, a nucleated red blood cell center is brighter than normal red blood cells simply because the bluest features are brightest in the blue light. Since the distinctive features of the nucleated red blood cells are bright in one color image component and dark in the other color image component, the intensity differences between nucleated red blood cells and normal red blood cells can be accentuated by inverting the intensities of one of the images 46 or 48 so that pixels which were dark are now bright and vice versa. In this example, the red image 46 is inverted so that the nucleated red blood cells now appear bright in both images.

A composite image is then formed by multiplying the inverted red image with the blue image 48. The relative degree of nucleated red blood cell distinctiveness in the red and blue images can however vary greatly subject to the variability and the sample preparation and staining process. The composite image greatly enhances the brightness contrast of nucleated red blood cells. By making cooperative use of the red and blue images, the dependence on nucleated red blood cells contrast on stain variability is greatly reduced.

Figure 5:
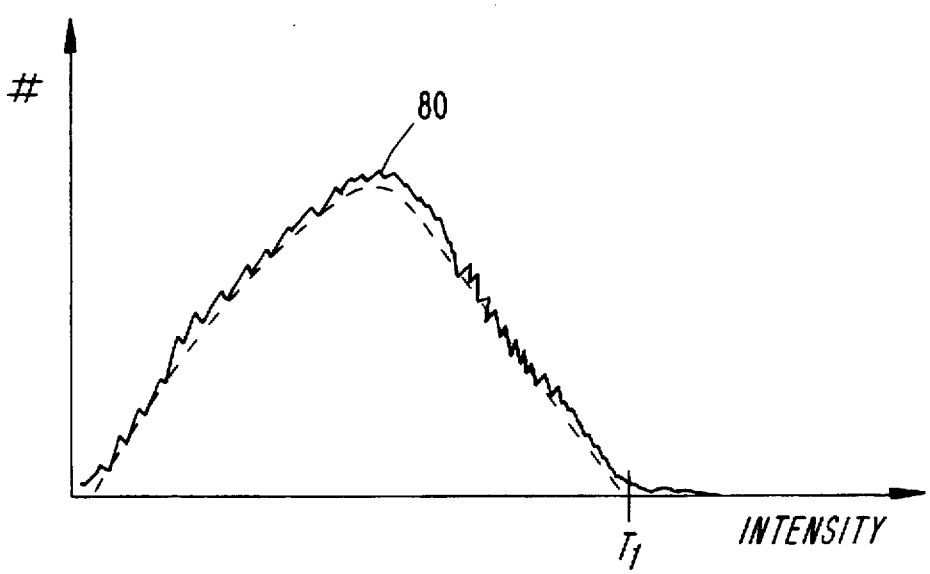
FIG. 5 illustrates a histogram for generating a mask B according to one embodiment of the present invention.

In order to separate the nucleated red blood cells from the normal red blood cells, an intensity histogram of the composite image is used. The intensity histogram is illustrated in FIG. 5. Since almost all of the features in the composite image are red blood cells of some form, most of the data in the intensity histogram forms a node 80. Since nucleated red blood cells are brighter than the normal red blood cells, the nucleated red blood cells are not represented by the node 80.

Thus, the nucleated red blood cells can be separated from the normal red blood cells by defining a threshold T1. The threshold T1 can be selected in a variety of ways. One such way will now be described.

First, the data in the intensity histogram is smoothed using a known technique. Then, a Gaussian function, illustrated by the dashed line 84, is selected to fit the smoothed data. As noted in FIG. 5, the Gaussian function falls to zero at a certain point. According to this embodiment of the present invention, the threshold value T1 is defined as the point at which the Gaussian function falls to zero. As a result, a second mask, mask B, can be formed by assigning a 1 to any pixel with an intensity greater than T1 since there is a high probability that these pixels represent nucleated red blood cells. In addition, all pixels with an intensity less than T1 are assigned 0's. Thus, when the mask B is multiplied by the original image, only a few of the thousands of original cells will remain in the resulting composite image.

Each of the remaining features in the composite image is then analyzed to determine if the feature has at least a certain size consistent with characteristics associated with fetal cells. For example, all features which have less than 50 pixels can be discarded since the nuclei of nucleated red blood cells have at least a certain size. It will be understood by those skilled in the art that the selection of 50 pixels is just illustrative and does not limit the present invention thereto.

The mask B is then updated where pixels which represent features with less than the predetermined number of pixels are assigned 0's. The locations of all the remaining features are then stored in memory and a "portrait" gallery of each feature is created. This basically ends the bulk filtering process of the present invention.

In the present invention, the processing now switches from global analysis to local analysis of each remaining feature. The local analysis can either be user controlled or automated. The remaining features can be subjected to shape and/or color analysis. Nucleated red blood cells are basically round and should have a size within a certain size range. Thus, the remaining features can each be analyzed, for instance, by comparing the circumference of the feature with the area of the feature, wherein features with certain circumference to area ratios are determined to be nucleated red blood cells. In addition, nucleated red blood cells contain different colors from other artifacts remaining in the composite image. Thus, the remaining features can be subjected to standard color analysis to select out the nucleated red blood cells. The result of the local analysis is a list of probable nucleated red blood cells and a list of other artifacts. A user can then take the list of probable nucleated cells and subject these cells to detailed DNA diagnostic analysis since the locations of the cells in the sample have been determined and the cellular morphology has not been destroyed by the image analysis.

In summary, the present invention has several unique features and capabilities. The bulk filtering is executed via a form of non-supervised color based classification, which requires no case-to-case manual training of the system. The value of this characteristic is that operation of the system requires no inherent understanding of image processing by the system operator, requires no color judgements by the system operator. In addition, objective color classification is executed automatically with a very high degree of repeatability independent from the experience level of the operator.

The bulk filtering is executed based solely on global image color properties. A value of this characteristic is that the color-based segmentation is executed independently from the cell size and shape characteristics and independently from color properties at the level of discrete cells, which allows for very fast multi-step image segmentation. The final stage of bulk filtering employs a Gaussian statistical analysis of color-segmented and color processed image data to achieve a final segmentation which automatically identifies the outliers from normal cell populations. The value of this characteristic is that initial isolation of rare cell candidates is both automatic and fast and is based on sound statistical methods.

Furthermore, the multi-step bulk filtering process reduces the volume of cell digital image data to a very small fraction, typically well below 1% of the initial image data. As a result, subsequent compute-intensive size, shape, and colorimetric processing of individual cell image features operate on a highly reduced amount of data, thereby greatly increasing the amount of processing time.

Finally, the present invention exploits the a priori knowledge that cellular image features of interest, e.g., fetal cell nuclei, which survive the color morphology base bulk filtering will have image areal sizes .i.e., pixel counts, in a specific numerical range. As a result, almost all image artifacts, e.g., image noise, image granularity, foreign matter, etc., which survive the global image filtering processes can be quickly culled based solely on one parameter, e.g., size. It will be appreciated by those of ordinary skill in the art the present invention can be embodied in other specific forms without departing from the spirit or central character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced herein.

I claim:

1. A method for detecting nucleated red blood cells in a sample of maternal blood, comprising the steps of:
    generating a color image of said sample;
    decomposing said color image into its color components;
    generating a first mask based upon a first color characteristic of said nucleated red blood cells;
    filtering said red and blue color components of said color image using said mask to produce first and second composite images which contain features having said first color characteristic;
    inverting the intensity of said first composite image;
    combining said inverted composite image and said second composite image to form a third composite image, wherein said first color characteristic is enhanced;
    generating a second mask based upon other characteristics of said nucleated red blood cells;
    filtering said third composite image using said second mask to create a fourth composite image;
    revising said second mask wherein features in said fourth composite image which are less than a predetermined size are blocked out;
    filtering said color image using said revised second mask to produce a fifth composite image;
    analyzing color and/or shape of features in said fifth composite image; and
    generating a list of locations of probable nucleated red blood cells from said color and/or shape analysis.

2. A method according to claim 1, wherein said color image is decomposed into red, green, and blue components.

3. A method according to claim 2, wherein said first color characteristic is that red blood cells are considerably darker than white blood cells in said blue image component.

4. A method according to claim 3, wherein said first mask is generated by displaying said blue image component as an intensity histogram and selecting an intensity threshold value wherein pixels with intensities less than said threshold value are assigned a 1 and pixels with intensities greater than said threshold value are assigned a 0.

5. A method according to claim 4, wherein said threshold value separates the red blood cells from the white blood cells.

6. A method according to claim 1, wherein said first composite image is a red composite image.

7. A method according to claim 1, wherein said first composite image is a blue composite image.

8. A method according to claim 1, wherein said second mask is used to separate nucleated red blood cells from normal red blood cells.

9. A method according to claim 1, wherein said other characteristics of said nucleated red blood cells are that a central region of a nucleated red blood cell is darker than normal red blood cells in the red image component and the central region of the nucleated red blood cell is brighter than normal red blood cells in the blue image component.

10. An apparatus for detecting nucleated red blood cells in a sample of maternal blood, comprising:
    means for generating a color image of said sample;
    means for decomposing said color image into its color components;
    means for generating a first mask based upon a first color characteristic of said nucleated red blood cells;
    means for filtering said red and blue color components of said color image using said mask to produce first and second composite images which contain features having said first color characteristic;
    means for inverting the intensity of said first composite image;
    means for combining said inverted composite image and said second composite image to form a third composite image, wherein said first color characteristic is enhanced;
    means for generating a second mask based upon other characteristics of said nucleated red blood cells;
    means for filtering said third composite image using said second mask to create a fourth composite image;
    means for revising said second mask wherein features in said fourth composite image which are less than a predetermined size are blocked out;
    means for filtering said color image using said revised second mask to produce a fifth composite image;
    means for analyzing color and/or shape of features in said fifth composite image; and
    means for generating a list of locations of probable nucleated red blood cells from said color and/or shape analysis.

11. An apparatus according to claim 10, wherein said color image is decomposed into red, green, and blue components.

12. An apparatus according to claim 11, wherein said first color characteristic is that red blood cells are considerably darker than white blood cells in said blue image component.

13. An apparatus according to claim 12, wherein said first mask is generated by displaying said blue image component as an intensity histogram and selecting an intensity threshold value wherein pixels with intensities less than said threshold value are assigned a 1 and pixels with intensities greater than said threshold value are assigned a 0.

14. An apparatus according to claim 13, wherein said threshold value separates the red blood cells from the white blood cells.

15. An apparatus according to claim 10, wherein said first composite image is a red composite image.

16. An apparatus according to claim 10, wherein said first composite image is a blue composite image.

17. An apparatus according to claim 10, wherein said second mask is used to separate nucleated red blood cells from normal red blood cells.

18. An apparatus according to claim 10, wherein said other characteristics of said nucleated red blood cells are that a central region of a nucleated red blood cell is darker than normal red blood cells in the red image component and the central region of the nucleated red blood cell is brighter than normal red blood cells in the blue image component.

* * * * *